United States Patent
Wielhorski et al.

(10) Patent No.: US 12,203,214 B2
(45) Date of Patent: Jan. 21, 2025

(54) ADJUSTMENT OF TWIST TO OPTIMIZE MOULDS AND THE SHAPING OF TEXTILE ARCHITECTURES

(71) Applicant: SAFRAN AIRCRAFT ENGINES, Paris (FR)

(72) Inventors: Yanneck Wielhorski, Moissy-Cramayel (FR); Julien Paul Schneider-Die-Gross, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 18/554,388

(22) PCT Filed: Mar. 28, 2022

(86) PCT No.: PCT/FR2022/050579
§ 371 (c)(1),
(2) Date: Oct. 6, 2023

(87) PCT Pub. No.: WO2022/214751
PCT Pub. Date: Oct. 13, 2022

(65) Prior Publication Data
US 2024/0084506 A1     Mar. 14, 2024

(30) Foreign Application Priority Data
Apr. 7, 2021   (FR) .......................... 2103570

(51) Int. Cl.
*B29C 70/20*    (2006.01)
*B29C 43/02*    (2006.01)
*D07B 7/02*     (2006.01)

(52) U.S. Cl.
CPC ............ *D07B 7/027* (2013.01); *B29C 43/027* (2013.01); *B29C 70/205* (2013.01); *B29C 2791/002* (2013.01); *D07B 2201/106* (2013.01)

(58) Field of Classification Search
CPC .............................. B29C 70/205; B29C 70/00
See application file for complete search history.

(56) References Cited

U.S. PATENT DOCUMENTS

| | | | |
|---|---|---|---|
| 4,473,217 A * | 9/1984 | Hashimoto | B29C 53/12 264/165 |
| 5,071,687 A * | 12/1991 | Shigetoh | B29C 70/205 428/113 |

(Continued)

FOREIGN PATENT DOCUMENTS

| | | |
|---|---|---|
| CN | 105592995 A | 5/2016 |
| EP | 1 526 216 A1 | 4/2005 |

(Continued)

OTHER PUBLICATIONS

Written Opinion of the International Searching Authority as issued in International Patent Application No. PCT/FR2022/050579, dated Jul. 8, 2022.

(Continued)

*Primary Examiner* — Andrew D Graham
(74) *Attorney, Agent, or Firm* — Pillsbury Winthrop Shaw Pittman LLP

(57) ABSTRACT

An installation for compacting strands or a preform including strands, the strands or the preform including at least a first portion in which the strands are twisted at a first angle and a second portion in which the strands are twisted at a second angle different from the first angle, the installation including a mould which includes the strands or the preform, and wherein the mould has at least a first part in which the first portion of the strands or of the preform is disposed, having a first thickness and a second part in which the (Continued)

second portion of the strands or of the preform is disposed, having a second thickness different from the first thickness.

4 Claims, 3 Drawing Sheets

(56) References Cited

U.S. PATENT DOCUMENTS

| | | | | |
|---|---|---|---|---|
| 5,092,727 | A * | 3/1992 | Moghe | D04C 1/06 411/908 |
| 2015/0217508 | A1* | 8/2015 | Rossi | D04C 1/06 428/80 |
| 2016/0067928 | A1* | 3/2016 | Mark | B29C 70/16 425/150 |
| 2016/0107379 | A1* | 4/2016 | Mark | B29C 64/188 700/98 |
| 2016/0243777 | A1* | 8/2016 | Marchal | B29C 43/006 |
| 2016/0311165 | A1* | 10/2016 | Mark | B29C 64/386 |
| 2016/0354982 | A1* | 12/2016 | Prause | B29C 70/34 |
| 2018/0065314 | A1* | 3/2018 | Rossi | B29C 33/448 |
| 2018/0162076 | A1* | 6/2018 | Most | B29C 70/548 |
| 2018/0339431 | A1* | 11/2018 | Hahn | B29C 33/306 |
| 2019/0177886 | A1* | 6/2019 | Wu | D07B 1/16 |
| 2019/0248969 | A1* | 8/2019 | Callens | B29C 70/08 |
| 2021/0237339 | A1* | 8/2021 | Takenaka | C08J 5/042 |

FOREIGN PATENT DOCUMENTS

| | | |
|---|---|---|
| EP | 2 902 179 A2 | 8/2015 |
| JP | S60-009987 A | 1/1985 |
| WO | WO 2020/120869 A1 | 6/2020 |

OTHER PUBLICATIONS

First Office Action as issued in Chinese Patent Application No. 202280026049.7, dated Jan. 27, 2024.
International Search Report as issued in International Patent Application No. PCT/FR2022/050579, dated Jul. 8, 2022.

* cited by examiner

[Fig. 1]
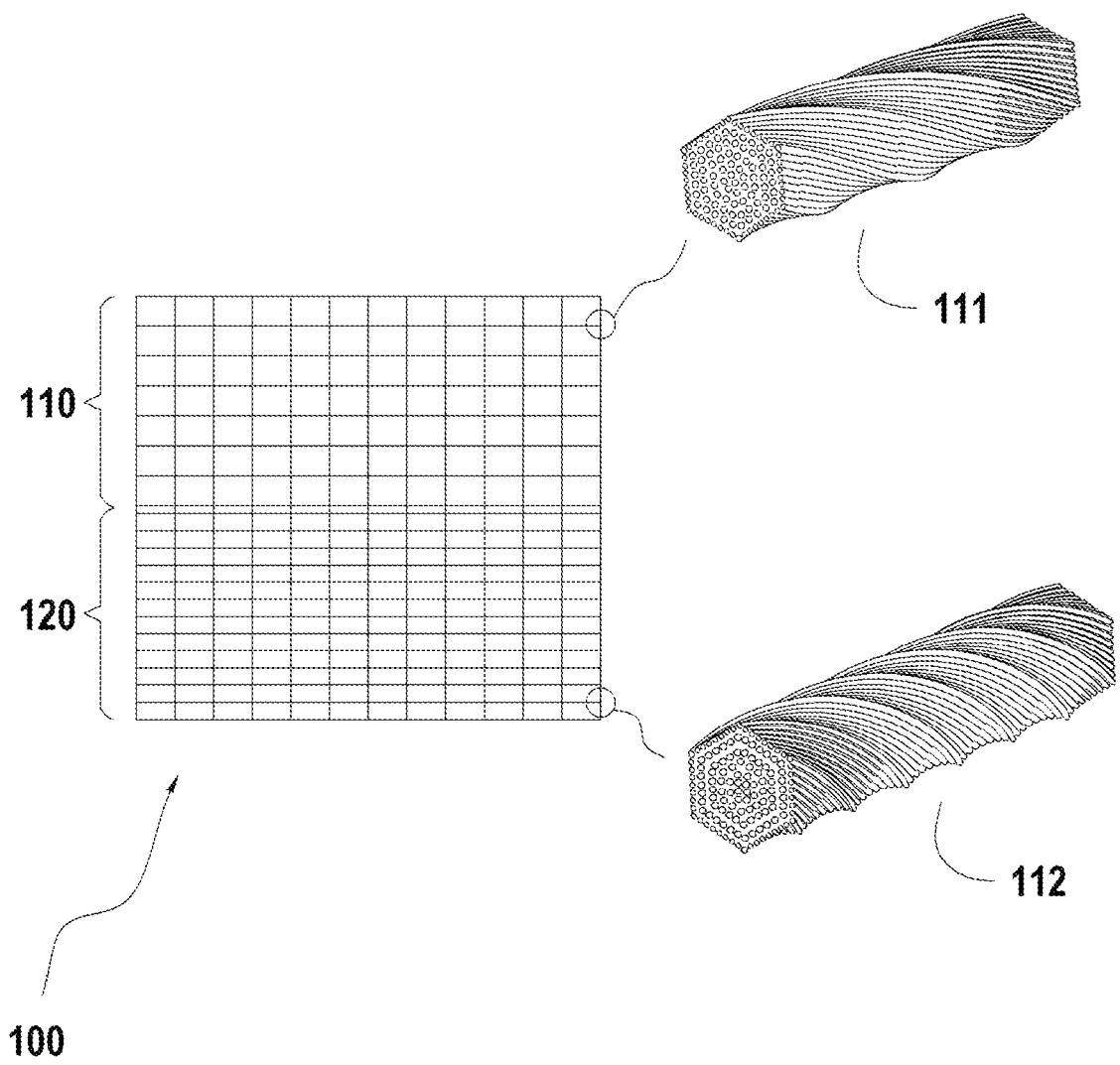

[Fig. 2A]
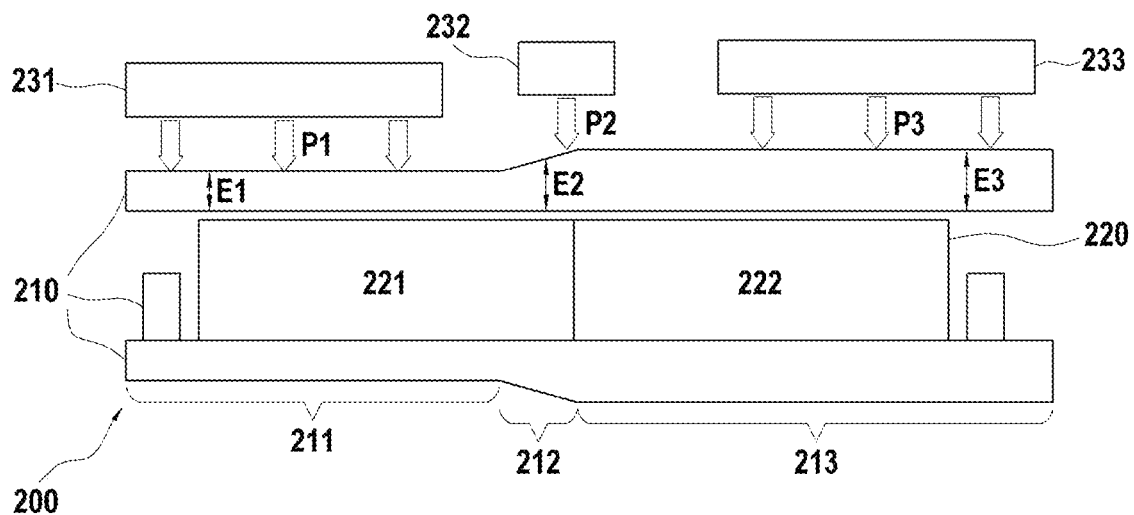
[Fig. 2B]
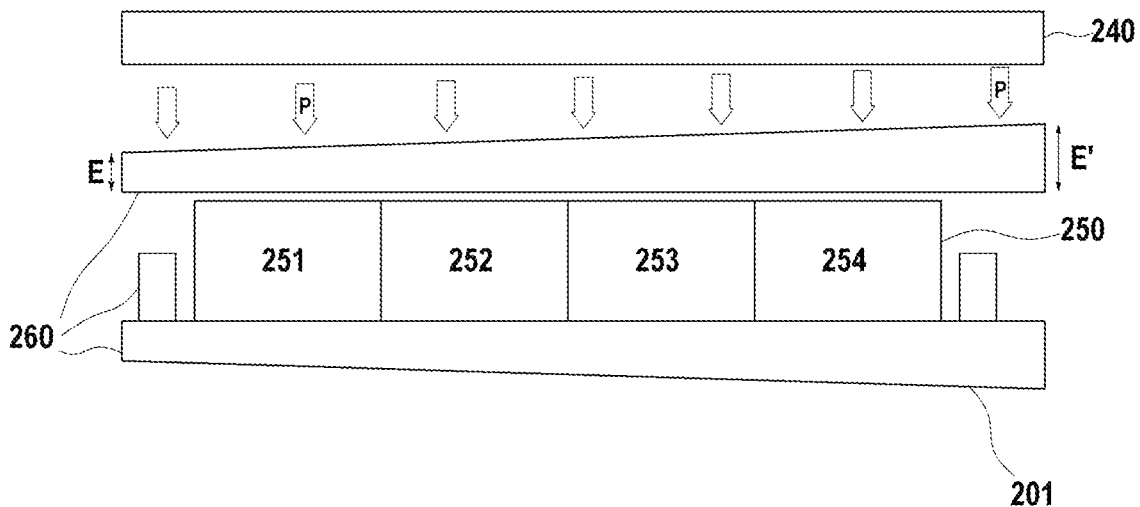

[Fig. 3]
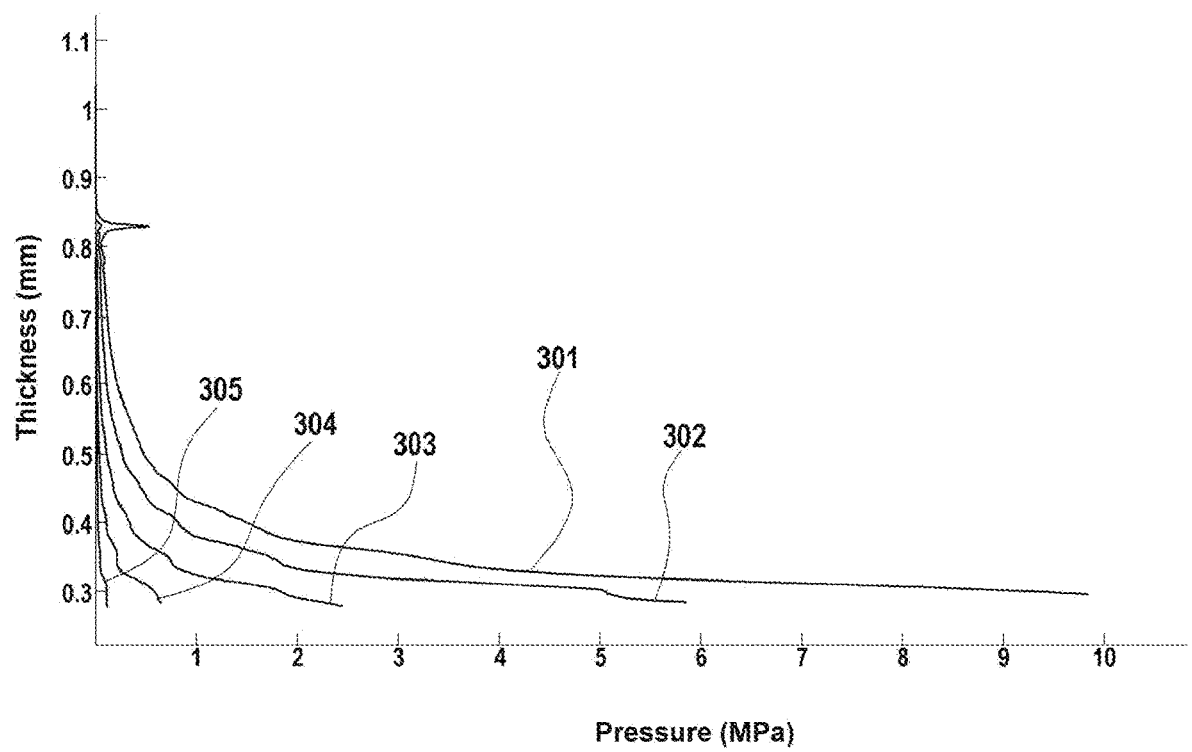

ADJUSTMENT OF TWIST TO OPTIMIZE MOULDS AND THE SHAPING OF TEXTILE ARCHITECTURES

CROSS-REFERENCE TO RELATED APPLICATIONS

This application is the U.S. National Stage of PCT/FR2022/050579, filed Mar. 28, 2022, which in turn claims priority to French patent application number 21 03570 filed Apr. 7, 2021. The content of these applications are incorporated herein by reference in their entireties.

TECHNICAL FIELD

The present invention relates to the general field of compacting of woven preforms and more particularly to the compacting of preforms comprising woven strands having a variable twist.

PRIOR ART

In the field of composite material parts having a woven fibrous reinforcement, the strands for the weave are usually oriented in preferred directions in order to obtain the desired strength properties.

If it is desired to give the part shear strength, then it is necessary to orient differently the strands of the fibrous preform forming the fibrous reinforcement of the part. To do this, the strands are twisted with a value of 10 to 30 turns, which amounts to applying an angle of between 5° and 15° with respect to the main direction of the strand.

However, this leads to a larger compaction force for squeezing the strands and therefore the entire fibrous preform. Moreover, the preform can have various twist angles of the strands in order to adapt, for example, to the radius of curvature of the part.

It has been observed that currently, in order to compact the preform, a mould is used which is sized to support the largest compaction force, whatever the degree of twisting of the strands. For example, conventionally the moulds are sized with the strands twisted with a value of 20 turns per metre.

DISCLOSURE OF THE INVENTION

The object of the present invention is to provide a compacting solution which can be adapted to the variable degree of twisting of the strands and thus avoid oversizing of the moulds during the compacting of the strands.

More specifically, the invention relates to an installation for compacting strands or a preform comprising strands, the strands or the preform comprising at least a first portion in which the strands are twisted at a first angle and a second portion in which the strands are twisted at a second angle different from the first angle, the installation comprising a mould which comprises the strands or the preform, and characterised in that the mould has at least a first part in which the first portion of the strands or of the preform is disposed, having a first thickness and a second part in which the second portion of the strands or of the preform is disposed, having a second thickness different from the first thickness.

As explained below, the inventors have observed after study that the moulds were oversized in order to be able to support the largest compaction force applied to the strands. They have also observed that according to the twist of the strands, the thickness of the mould containing the strands could be adapted according to the applied compaction force.

Consequently, according to the invention, the mould of the compacting installation has a variable thickness which depends on the degree of twisting or the angle of twist of the strands. Hence, the zones of the mould receiving the strands having a large angle of twist are thicker than the zones of the mould receiving non-twisted or weakly twisted strands.

Therefore, the mould according to the invention has a plurality of parts of variable thickness, the thickness of each part depending on the angle of twist of the strands placed in each part.

This makes it possible to not oversize the mould, i.e to not size the mould uniquely according to the largest compaction force applied.

According to a particular feature of the invention, the first angle is less than the second angle and the first thickness is less than the second thickness.

According to another particular feature of the invention, the installation also comprises means for applying at least a first pressure on the first part of the mould and a second pressure, different from the first pressure, on the second part of the mould.

The means for applying the first and second pressures make it possible to apply a compaction force on the strands and the preform. The pressures applied depend on the angles of twist and on the thicknesses of the mould. Hence, the more the thickness of the mould is reduced, the lower the pressure applied on the mould.

According to another particular feature of the invention, the first pressure is less than the second pressure.

Another object of the invention is a method for compacting strands or a preform comprising strands, the strands or the preform comprising at least a first portion in which the strands are twisted at a first angle and a second portion in which the strands are twisted at a second angle different from the first angle, the method being characterised in that it comprises:

placing the strands or the preform in a mould so that the first portion of the strands or of the preform is disposed in a first part of the mould and the second portion of the strands or of the preform is disposed in a second part of the mould, the first part of the mould having a first thickness and the second part of the mould having a second thickness different from the first thickness; and
applying a first compaction pressure on the first part of the mould and a second compaction pressure, different from the first pressure, on the second part of the mould.

According to a particular feature of the invention, the values of first and second pressures are determined according to the first and second angle and/or the first and second thickness.

According to another particular feature of the invention, the first angle is less than the second angle, the first pressure is less than the second pressure and the first thickness is less than the second thickness.

BRIEF DESCRIPTION OF THE FIGURES

Other features and advantages of the present invention will become apparent from the description given below, with reference to the appended drawings which illustrate exemplary embodiments that are in no way limiting.

FIG. 1 shows, schematically and partially, an example of a preform that will be compacted with an installation or a method according to the invention.

FIG. 2A shows, schematically and partially, a compacting installation according to an embodiment of the invention.

FIG. 2B shows, schematically and partially, a compacting installation according to an embodiment of the invention.

FIG. 3 shows the thickness of the strand as a function of the compacting pressure for strands having different degrees of twisting.

DESCRIPTION OF THE EMBODIMENTS

FIG. 1 shows, schematically and partially, a preform 100 that can be compacted with a compacting installation and/or a compacting method according to the invention.

The preform 100 comprises two portions 110 and 120 each comprising strands 111 and 112. The strands 111 and 112 consist of a plurality of fibres twisted together by a fibre plying or twisting operation. The twisting consists of twisting the plurality of fibres, considering the centre of the cross-section of the strand as the axis of rotation. In this way, a twist angle of the fibres with respect to the main direction is obtained, which changes as a function of the position along the radius of the strand. Hence there is an angle equivalent to 0° at the centre of the strand and maximum at the periphery of the strand. This orientation of the fibres with respect to the direction of the strand makes it possible to give more strength to the strand and hence to limit its fraying during any weaving operation of the strands.

The fibres constituting the strands 111 and 112 are, for example, carbon, glass or Kevlar fibres. The strands 111, 112 can, for example, be produced from 48,000 fibres by twisting 4 wicks of 12,000 fibres, or be produced from 24,000 fibres by twisting 2 wicks of 12,000 fibres.

In the first portion 110, the strands 111 are twisted at a first twist angle, and in the second portion 120, the strands 112 are twisted at a second twist angle, greater than the first angle. For example, the strands 111 have a twist of 10 turns per metre, which is equivalent to a twist angle of 5° with respect to the main direction of the strand; while the strands 112 have a twist of 30 turns per metre, which is equivalent to a twist angle of 15° relative to the main direction of the strand.

FIG. 2A shows, schematically and partially, a compacting installation 200 according to an embodiment.

The installation 200 comprises a compacting mould 210 in which a preform 220 comprising strands is placed. As explained with reference to FIG. 1, the preform 220 comprises a plurality of portions 221 and 222 in which the strands have different twist angles. In this example, the first portion 221 of the preform 220 comprises strands twisted at a first angle α1 and the second portion 222 comprises strands twisted at a second angle α2. The angle α2 is greater than the angle α1.

According to the invention, the mould 210 comprises a plurality of parts 211, 212 and 213 of variable thickness E1, E2, E3, each part being intended to receive at least a part of one of the portions of the preform 220. The thicknesses E1, E2 and E3 of the mould 210 are defined as a function of the twist angles of the various portions of the preform 220. Hence, the part of the mould 210 intended to receive the portion of the preform 220 having the lowest twist angle is the part having the lowest thickness, and the part of the mould 210 intended to receive the portion of the preform 220 having the highest twist angle is the part having the largest thickness. By considering that the thickness E1 is less than the thickness E3, and that E2 is a thickness varying between E1 and E3, the first part 211 of the mould 210, of thickness E1, is intended to receive the portion 221 of the preform 220, and the third part 213 of the mould 210, of thickness E3, is intended to receive the portion 222. The second part 212 of the mould 210, of variable thickness E2, makes it possible to form the junction between the two portions 221 and 222 of the preform 220 in order to adapt the compaction force to the difference in twist angle between the two portions 221 and 222.

The installation 200 can also comprise means 231, 232 and 233 for applying a pressure P1, P2, P3 on the mould 210, and more particularly on certain parts of the mould 210. The pressures P1, P2 and P3 applied by the different means 231, 232 and 233 depend on the thickness of the mould and the twist angle of the strands.

In this example, the pressure P1 is less than the pressure P2 which is itself less than the pressure P3. The pressure P1 is applied by the application means 231 on the first part 211 of the mould 210, the part which has the lowest thickness E1. The pressure P3 is applied by the application means 233 on the third part 213 of the mould 210, which has the largest thickness E3. Finally, the pressure P2 is applied by the application means 232 on the second part 212 of the mould 210. The pressure P2 is an intermediate pressure between P1 and P3, it is therefore adapted to the junction between the two portions 221 and 222 of the preform 220 which have different twist angles.

Using the installation presented, it is possible, for example, during closure of the mould and the injection of a resin into the mould, to adapt the pressures P1, P2 and P3 applied locally in order to obtain a compacted preform having a constant thickness, despite the different twist angles within the preform.

FIG. 2B shows, schematically and partially, a compacting installation 201 according to another embodiment of the invention.

The installation 201 comprises a compacting mould 260 in which a preform 250 comprising strands is placed. As explained with reference to FIG. 1, the preform 250 comprises a plurality of portions 251, 252, 253 and 254 in which the strands have different twist angles. In this example, the first portion 251 of the preform 250 comprises the most weakly twisted strands, while the fourth portion 254 comprises the most strongly twisted strands. The second and third portions 252 and 253 have intermediate twist angles, such that the twist angle is increasing from the first portion 251 to the fourth portion 254.

According to the invention, the mould 260 comprises a plurality of parts of variable thickness. Hence, in this embodiment, the thickness of the mould is increasing and varies between the thickness E and the thickness E', E' being greater than E. The part of the mould having the lowest thickness, i.e. a thickness E, is intended to receive the portion of the preform 250 having the lowest twist angle, i.e the portion 251. The part of the mould having the greatest thickness, i.e. the thickness E', is intended to receive the portion of the preform 250 having the highest twist angle, i.e. the portion 254. The increasing thickness of the mould between E and E' also makes it possible to adapt the increasing twist angles between the four portions 251, 252, 253 and 254.

The installation 201 can also comprise a means 240 for applying a uniform pressure P on the mould 260. Through the various thicknesses of the mould 260, the compaction force applied on the portions 251 to 254 of the preform 250 is thus very variable between the portions 251 to 254 due to the variation in thickness of the mould 260.

Through this installation, it is possible, for example, to obtain, during closure of the mould and the injection of a resin into the mould, a compacted preform having a variable thickness or a constant thickness, depending on the uniform pressure value P applied and the variations in thickness of the mould.

FIG. 3 is a graph showing, as ordinates, the thickness of the strand in millimetres (mm) as a function of the compaction pressure applied on the mould in the megapascal (MPa). The thickness of the strand is shown for a plurality of degrees of twisting of strands.

For each curve 301 to 305, the strands are formed of 24,000 fibres. For the curve 301, the strands have a twist of 30 turns per metre. For the curve 302, the strands have a twist of 25 turns per metre. The strands of curve 303 have a twist of 20 turns per metre, the strands of the curve 304 have a twist of 15 turns per metre and the strands of the curve 305 have a twist of 10 turns per metre. Hence, these are the strands of the curve 305 which are the most weakly twisted and those of curve 301 which are the most strongly twisted.

It is observed that for a given twist, the thicker the strands, the lower the compaction pressure to be applied; whereas for a given thickness of strand, the higher the degree of twisting, the larger the compacting pressure.

The expression "between . . . and . . . " should be understood as including the limits.

The invention claimed is:

1. An installation for compacting strands or a preform comprising strands, the strands or the preform comprising at least a first portion in which the strands are twisted at a first angle and a second portion in which the strands are twisted at a second angle different from the first angle and greater than the first angle, the installation comprising a mould which comprises the strands or the preform, wherein the mould has at least a first part in which the first portion of the strands or of the preform is disposed, having a first thickness and a second part in which the second portion of the strands or of the preform is disposed, having a second thickness different from the first thickness and greater than the first thickness, wherein the first and second part are integral with each other so that the first and second parts form a one-piece element comprising a first side to be pressed against the strands or the preform comprising strands and a second side that is opposite the first side, the installation further comprising means for applying at least a first pressure on the first part of the mould and a second pressure, different from the first pressure, on the second part of the mould, said first and second pressures being each applied on the second side of the one-piece element formed by the first and second parts of the mould such that the strands twisted at the first angle and the strands twisted at the second angle are compacted with different pressures and the one-piece element is arranged between the strands or the preform comprising strands and the means for applying at least the first and second pressures during compaction.

2. The installation according to claim 1, wherein the first pressure is less than the second pressure.

3. A method for compacting strands or a preform comprising strands, the strands or the preform comprising at least a first portion in which the strands are twisted at a first angle and a second portion in which the strands are twisted at a second angle different from the first angle, the method comprising:
   placing the strands or the preform in a mould so that the first portion of the strands or of the preform is disposed in a first part of the mould and the second portion of the strands or of the preform is disposed in a second part of the mould, the first part of the mould having a first thickness and the second part of the mould having a second thickness different from the first thickness, the first and second part being integral with each other so that the first and second parts form a one-piece element comprising a first side to be pressed against the strands or the preform comprising strands and a second side that is opposite the first side; and
   applying a first compacting pressure on the first part of the mould and a second compacting pressure, different from the first pressure, on the second part of the mould such that the strands twisted at the first angle and the strands twisted at the second angle are compacted with different pressures, said first and second compacting pressures being each applied on the second side of the one-piece element formed by the first and second parts of the mould, the one-piece element being arranged between the strands or the preform comprising strands and the means for applying at least the first and second pressures during compaction, the values of first and second pressures being determined according to the first and second angle and/or the first and second thickness, and
   after applying the first compacting pressure on the first part of the mould and the second compacting pressure on the second part of the mould, injecting resin.

4. The compacting method according to claim 3, wherein the first angle is less than the second angle, the first pressure is less than the second pressure and the first thickness is less than the second thickness.

\* \* \* \* \*